United States Patent Office 2,811,025
Patented Oct. 29, 1957

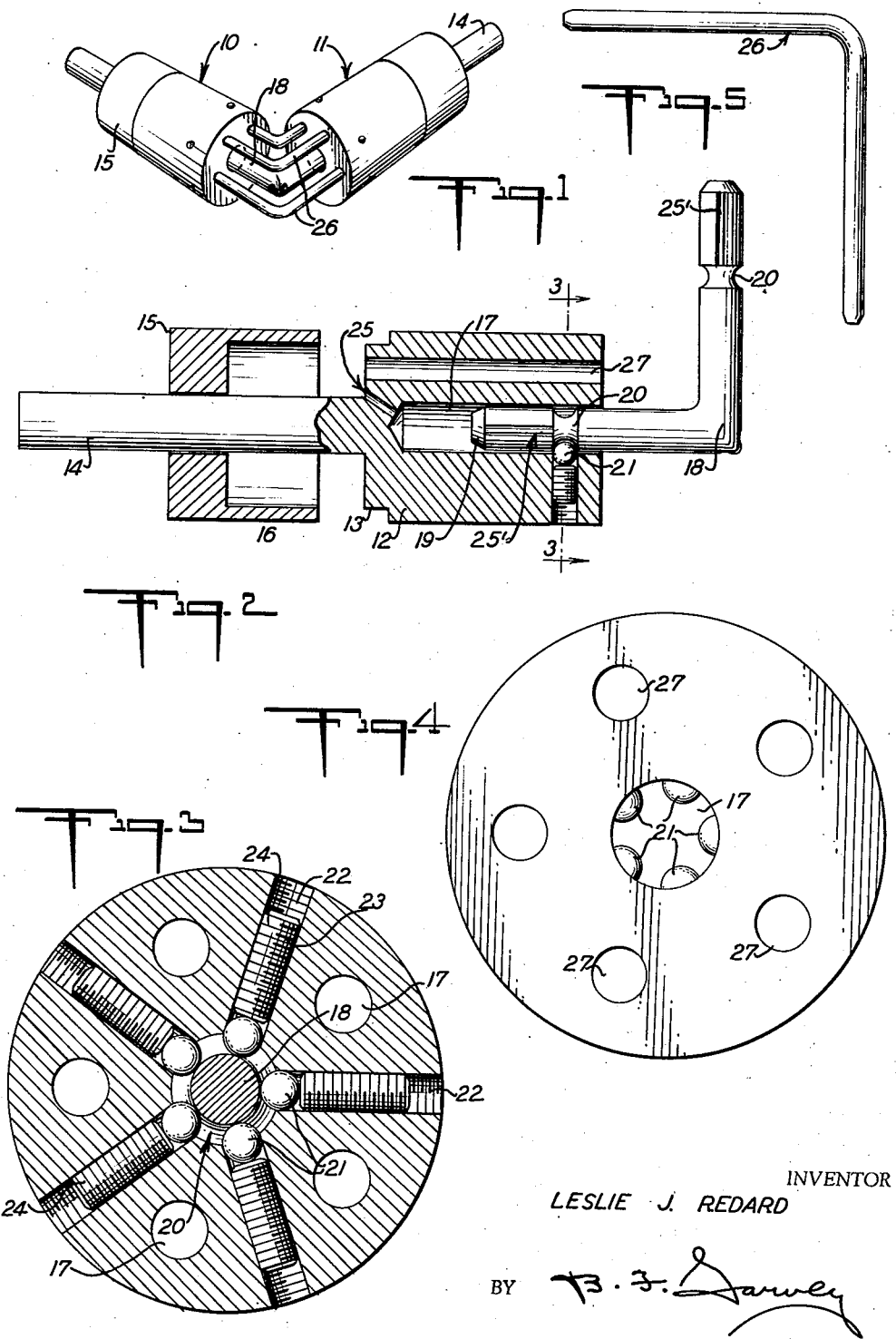

2,811,025
RIGHT ANGLE FLEXIBLE POWER COUPLING

Leslie J. Redard, Peoria, Ill., assignor to Flexi-Versal Corporation, Peoria, Ill.

Application April 6, 1954, Serial No. 421,337

4 Claims. (Cl. 64—20)

The present invention consists of a right angle flexible power coupling being an improvement on the universal joint of application, Serial Number 268,830 of John P. Kitselman filed January 29, 1952, which application and invention is in common ownership with my application and invention herein. We have found, after much experiment, that the device of the Kitselman application was a decided advance in the art and may be advantageously used, particularly where variable angularity is desired in power load transmission. With my improvement, I have found that a fixed 90 degree angle unit, including a friction bearing right angle shaft, may be advantageously used, particularly where load transmission is heavy and angle drive, heretofore requiring mitre gears, is essential.

It is therefore an object of this invention to provide a coupling, for use in the above environment, wherein a simple small assembly is employed which is self-contained and operates with minimum backlash, noise and vibration and because of anti-friction and constant lubrication may be used for an indefinite period of time without parts replacement.

A further object of this invention is to provide a coupling assembly which includes heads which are disposed at right angles when in use and held in this position by a connecting rod which is in rotatable connection with the heads, but which is normally held therein from longitudinal displacement, the bores of the heads being constantly supplied with lubrication.

Other objects of the invention will be apparent from the following description of the present preferred form of the invention taken in connection with the accompanying drawings, wherein:

Fig. 1 is a perspective view of a coupling assembly constructed in accordance with the present invention;

Fig. 2 is a detail enlarged view, partly in section, of one of the assembly heads, showing the manner of mounting one end of the connecting rod therein;

Fig. 3 is a sectional view taken on the line 3—3 of Fig. 2, looking in the direction of the arrows;

Fig. 4 is an end elevational view of one of the heads looking at the inner end in which the connecting rods are mounted; and Fig. 5 is a perspective view of one of the auxiliary connecting rods.

The assembly of this invention includes a pair of heads 10 and 11, each of which consists of a cylindrical solid head 12, the outer end of which is reduced, as indicated at 13 and the reduced end extended to provide an elongated power shaft 14. The outer end of each head is formed to provide a cap or cover 15 which is slidably mounted on its shaft 14 and frictionally engages the reduced end 13 of the body portion of the head. As will be observed from Fig. 2 of the drawing, the cover 15 is hollow to provide a lubricant well 16. The body of each head is provided with an axial recess 17 which is adapted for the reception of one end of a right angle main connecting rod 18. Preferably, the terminal of each rod is beveled, as indicated at 19 to facilitate its introduction into the bore of the head. A peripheral recess 20 is formed near each end of each of the main connecting rods 18, which is adapted for the reception of a plurality of ball bearings 21. Each of the ball bearings 21 is mounted in a radial opening 22, the outer ends of the openings being screw-threaded to complement screw threads 23 formed on screws or pins 24. The outer end of each pin or screw 24 is provided with a kerf adapted for the reception of a screwdriver, in a manner well known in the art. The ball bearings 21 are held captive in the annular recesses 20 by the pins 24. If and when it is desired to remove the main connecting rod 18 from the heads, the ball bearings 21 may be retracted from the grooves 20 in an obvious manner. Lubricant is supplied to each of the bores 17 through a duct 25 which opens through the aft end of the reduced portion 13 of the main body and also opens into each bore 17 as shown in Fig. 2. The duct 25 is in communication with the well 16 to supply lubricant to the bore in an obvious manner. Lubricant supplied to each bore 17 through its duct 15 also passes into its groove 20 through a lubricant groove 25' extending longitudinally in each end of the rod 18, as advantageously illustrated in Fig. 1.

The heads 10 and 11 are also connected by auxiliary connecting rods 26 which are of a smaller diameter than the main connecting rod 18 and are floatingly mounted in eccentrically arranged bores or openings 27 which extend completely through the body of each head 10 and 11 as also shown in Fig. 2. The eccentric bores 27 are in communication with the well 16 when the cover 15 is fitted over the reduced end 13 of the body of its head.

In use of this device, as power is applied to either of the shafts 14, rotation of the connecting members is effected so as to transmit the power to the opposite head, through the connecting rods 18 and 26, the latter, reciprocating, in an obvious manner, as the power shaft is operated.

While the invention has been described in detail in its presently preferred embodiment, it will, of course, be understood that such has been done for purposes of illustration only and not by way of limitation, and therefore only such limitations are to be imposed thereon as may reasonably come within the scope of the appended claims.

What I claim is:

1. A fixed angle flexible coupling including a pair of heads, each having an axial bore and circumferentially spaced bores parallelly disposed, a fixed angle connecting rod, the terminals of which are received in the axial bores of said heads and provided with peripheral recesses, each head having radial openings communicating with the axial bore of its head, captive ball bearings in said openings and axial bores, the ball bearings extending into and retained in said peripheral recesses to hold the connecting rod from longitudinal movement in the heads, and fixed angle connecting members, the terminals of which are floatingly mounted in said heads to transmit power from one head to the other.

2. A fixed angle flexible power coupling including a pair of heads each having an axial bore and a plurality of circumferentially spaced bores parallelly disposed, a fixed angle connecting rod, the terminals of which are received in the axial bores of said heads and provided with peripheral recesses, each head having radial openings communicating with the axial bore of its head, captive ball bearings in said openings and axial bores, the ball bearings extending into and retained in said peripheral recesses to hold the connecting rod from longitudinal movement in the heads, the terminals of each rod being further provided with lubricant ducts leading to the peripheral recesses, means for supplying lubricant to the lubricant ducts, and fixed angle connecting members, the terminals of which are floatingly mounted in the circumferentially spaced bores of each head to transmit power from one head to the other.

3. A fixed angle flexible power coupling as set out in claim 2 wherein a portion of each head is hollow to provide a well for the reception of a lubricant and the well is in communication with the axial and circumferentially spaced bores.

4. A flexible power coupling including a pair of heads disposed at an angle to each other, each having axial and circumferentially spaced bores parallelly disposed and equipped with a power shaft, a connecting rod, the terminals of which are received in the axial bores of said heads and provided with peripheral recesses, each head being provided with a plurality of radial openings, a ball bearing in each opening, protruding in part into the peripheral recess of one of the connecting rod terminals, a pin threaded in each radial opening to positively hold each ball in its recess and prevent longitudinal movement of said connecting rod in the heads, and connecting members, the terminals of which are floatingly mounted in the circumferentially spaced bores of said heads to transmit power from one head to the other.

References Cited in the file of this patent

UNITED STATES PATENTS

| | | |
|---|---|---|
| 1,896,133 | Chilton | Feb. 7, 1933 |
| 2,218,303 | Smith | Oct. 15, 1940 |
| 2,387,599 | Miller et al. | Oct. 23, 1945 |
| 2,543,134 | Smith et al. | Feb. 27, 1951 |